US 12,511,391 B1

(12) United States Patent
Hu et al.

(10) Patent No.: US 12,511,391 B1
(45) Date of Patent: Dec. 30, 2025

(54) DETECTION OF BRING YOUR OWN VULNERABLE DRIVER ATTACKS IN WINDOWS-BASED SYSTEMS

(71) Applicant: Trend Micro Incorporated, Tokyo (JP)

(72) Inventors: Wen-Tsung Hu, Taipei (TW); Chieh-Teng Wang, Taipei (TW); Yi-Da Huang, Taipei (TW); Chih-Jung Su, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 230 days.

(21) Appl. No.: 18/537,288

(22) Filed: Dec. 12, 2023

(51) Int. Cl.
  *G06F 21/56* (2013.01)
  *G06F 3/12* (2006.01)
  *G06F 9/4401* (2018.01)
  *G06F 13/10* (2006.01)
  *G06F 21/55* (2013.01)

(52) U.S. Cl.
  CPC .......... *G06F 21/566* (2013.01); *G06F 21/554* (2013.01); *G06F 3/1225* (2013.01); *G06F 9/4411* (2013.01); *G06F 13/105* (2013.01); *G06F 2221/034* (2013.01)

(58) Field of Classification Search
  CPC .... G06F 21/566; G06F 21/554; G06F 3/1225; G06F 9/4411; G06F 13/105; G06F 2221/034
  See application file for complete search history.

(56) References Cited

U.S. PATENT DOCUMENTS

| | | | | |
|---|---|---|---|---|
| 7,530,093 | B2 * | 5/2009 | Samuelsson | G06F 21/53 726/1 |
| 11,934,534 | B2 * | 3/2024 | Pande | G06F 21/566 |
| 2023/0297673 | A1 * | 9/2023 | Kondratyev | G06F 9/54 726/23 |
| 2024/0028501 | A1 * | 1/2024 | Qu | G06F 11/3684 |
| 2024/0220614 | A1 * | 7/2024 | Strogov | G06F 21/566 |

FOREIGN PATENT DOCUMENTS

| | | | | | |
|---|---|---|---|---|---|
| GB | | 2635541 A | * | 5/2025 | G06F 21/52 |
| WO | WO-2025065096 A1 | | * | 4/2025 | G06F 9/4411 |

OTHER PUBLICATIONS

"Device_Object Structure (wdm.h)", Windows Hardware Developer, Downloaded Dec. 8, 2023, https://learn.microsoft.com/en-us/windows-hardware/drivers/ddi/wdm/ns-wdm-_device_object.
(Continued)

*Primary Examiner* — Christopher A Revak
(74) *Attorney, Agent, or Firm* — Beyer Law Group LLP

(57) ABSTRACT

Bring Your Own Vulnerable Driver (BYOVD) attacks are detected in Windows-based desktop computers. An opening of a device handle to a device object by a process is detected in the desktop computer. An object path that is used in the opening of the device handle is obtained and parsed to identify a device name of the device object. The device name is compared to device names associated with drivers that have known vulnerabilities. The process that opened the device handle is detected as indicative of a BYOVD attack if the device name is associated with a driver that has a known vulnerability and the process is not a normal process.

19 Claims, 2 Drawing Sheets

(56) References Cited

OTHER PUBLICATIONS

Pierluigi Paganini, "'Bring Your Own Vulnerable Driver' Attack Technique is Becoming Popular Among Threat Actors", Sep. 11, 2023, https://cybernews.com/security/bring-your-own-vulnerable-driver-attack/.

"CreateFileA Function (fileapi.h)", Windows App Development, Downloaded Oct. 30, 2023, https://learn.microsoft.com/en-_us/windows/win32/_api_/fileapi/nf-fileapi-createfilea.

"InstallHinfSectionA Function (setupapi.h)", Windows App Development, Downloaded Nov. 28, 2023, https://learn.microsoft.com/en-us/windows/win32/api/setupapi/nf-setupapi-installhinfsectiona.

"Introduction to MS-DOS Device Names", Windows, Downloaded Dec. 8, 2023, https://learn.microsoft.com/en-us/windows-hardware/drivers/kernel/introduction-to-ms-dos-device-names.

"Microsoft Windows", Wikipedia, Downloaded Nov. 3, 2023, https://en.wikipedia.org/wiki/Microsoft_Windows.

"NT Device Names", Windows, Downloaded Nov. 2, 2023, https://learn.microsoft.com/en-us/windows-hardware/drivers/kernel/nt-device-names.

"NtOpenFile Function (winternl.h)", Downloaded Nov. 2, 2023, https://learn.microsoft.com/en-us/windows/win32/api/winternl/nf-winternl-ntopenfile.

"CVE-2020-36603 Detail", National Vulnerability Database, Downloaded Nov. 3, 2023, https://nyd.nist.gov/vuln/detail/CVE-2020-36603.

Ryan Soliven and Hitomi Kimura, "Ransomware Actor Abuses Genshin Impact Anti-Cheat Driver to Kill Antivirus", Trend Micro, Aug. 24, 2022, https://www.trendmicro.com/en_za/research/22/h/ransomware-actor-abuses-genshin-impact-anti-cheat-driver-to-kill-antivirus._html#:%7E:text=Ransomw%E2%80%A6.

Andreas Klopsch, "Remove All The Callbacks—BlackByte Ransomware Disables EDR Via RTCore64.sys Abuse", Sophos News, Oct. 4, 2022, https://news.sophos.com/en-us/2022/10/04/blackbyte-ransomware-returns/.

"StartServiceA Function (winsvch.h)", Windows App Development, Downloaded Nov. 28, 2023, https://learn.microsoft.com/en-us/windows/win32/api/winsyc/nf-winsvc-startservicea.

"Using Control Device Objects", Windows, Downloaded Dec. 8, 2023, https://learn.microsoft.com/en-us/windows-hardware/drivers/wdf/using-control-device-objects.

"What is a Driver?", Windows, Downloaded Dec. 8, 2023, bttps://learn.microsoft.com/en-us/windows-hardware/drivers/gettingstarted/what-is-a-driver-.

* cited by examiner

DETECTION OF BRING YOUR OWN VULNERABLE DRIVER ATTACKS IN WINDOWS-BASED SYSTEMS

TECHNICAL FIELD

The present disclosure is directed to cybersecurity, and more particularly to drivers with known vulnerabilities.

BACKGROUND

A Windows-based system is a desktop computer that runs the MICROSOFT WINDOWS operating system. Although, there are different versions of the MICROSOFT WINDOWS operating system, these versions share common features to maintain compatibility. The MICROSOFT WINDOWS operating system is currently the most popular desktop operating system in the world and is thus the target of numerous cyberattacks.

The MICROSOFT WINDOWS operating system supports different types of drivers. A hardware driver allows an application program to communicate with an associated hardware device, such as storage devices, graphics card, keyboard, mouse, joystick, etc. Other drivers, such as filter drivers and software drivers, do not necessarily have an associated hardware device. A driver can create a logical device, referred to as a "device object" as its input/output (I/O) interface to allow other components, such as user-mode application programs, to communicate with the driver. Drivers in a Windows-based system have the dot sys (i.e., ".sys") file extension.

Drivers, just like any other pieces of software, can have vulnerabilities that may be exploited by threat actors (i.e., hackers, cybercriminals). When discovered in the wild, a vulnerability becomes known and is published by cybersecurity organizations to alert software vendors and other affected users. Most known vulnerabilities are mitigated upon discovery. Unfortunately, this is not always the case.

The so-called Bring Your Own Vulnerable Driver (BYOVD) attack is a cyberattack that involves using a legitimate but vulnerable driver. The driver involved is legitimate in that it is from a reputable source (e.g., a reputable vendor) and may even be code-signed, and is vulnerable because it has a known vulnerability. An example BYOVD attack is the use of the anti-cheat driver of the Genshin Impact videogame, "myprot2.sys" (which is a software driver), to terminate antivirus processes and subsequently perform malicious actions on the victim desktop computer. This particular BYOVD attack can be easily perpetrated given that the anti-cheat driver is legitimate and can be used without the videogame, and will thus remain a cyber threat in the wild until the code signing certificate of the anti-cheat driver is revoked.

BRIEF SUMMARY

Bring Your Own Vulnerable Driver (BYOVD) attacks are detected in Windows-based desktop computers. In an embodiment, an opening of a device handle to a device object by a process is detected in the desktop computer. An object path that is used to open the device handle is obtained and parsed to identify the device name of the device object. The device name is compared to monitored device names associated with drivers that have known vulnerabilities. The process that opened the device handle is detected as indicative of a BYOVD attack if the device name is a monitored device name and the process is not a normal process.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
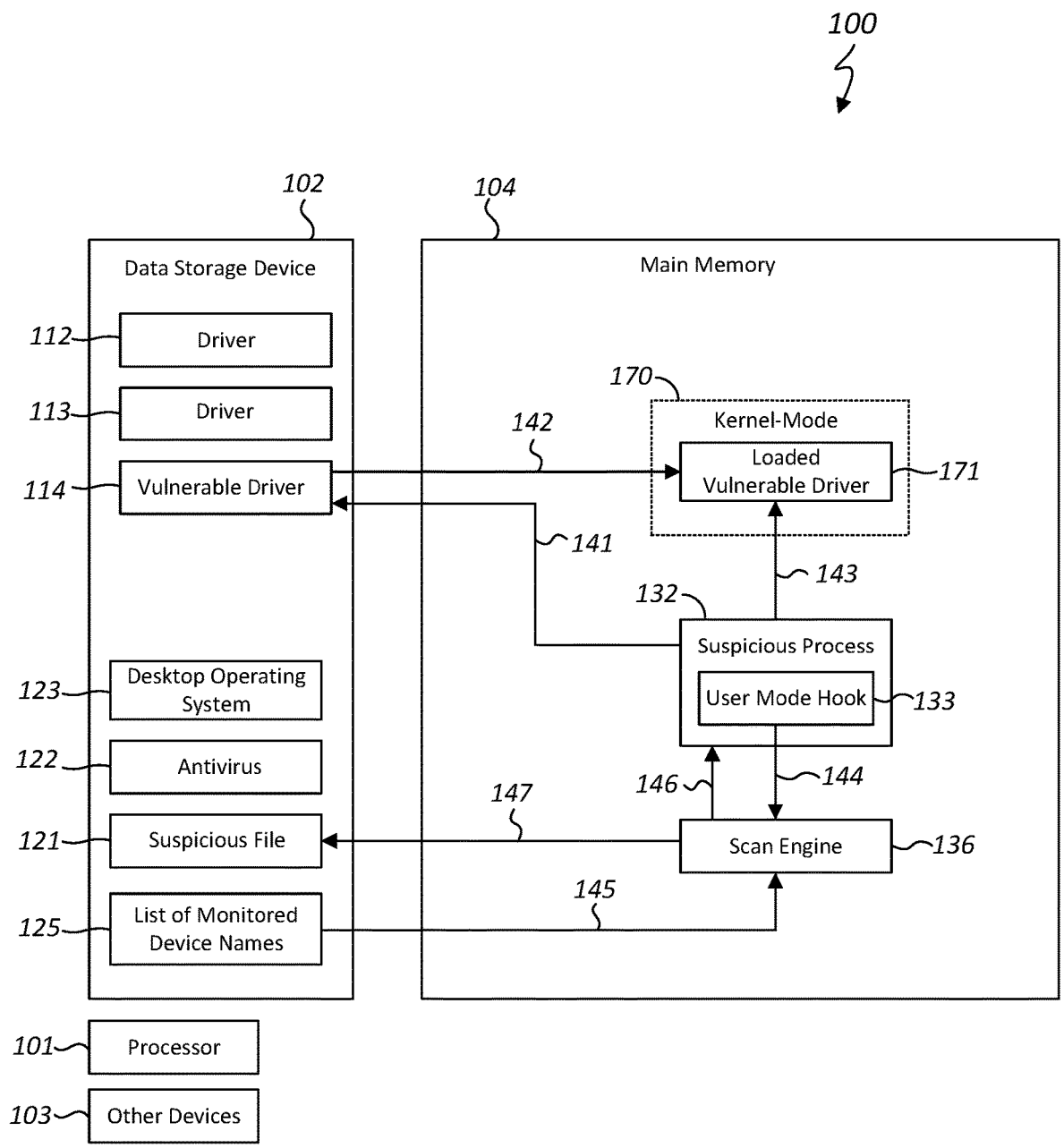
FIG. 1 shows a block diagram of a Windows-based desktop computer, in accordance with an embodiment of the present invention.

FIG. 1 shows a block diagram of a Windows-based desktop computer 100, in accordance with an embodiment of the present invention. The desktop computer 100 may be a laptop, personal computer, or other computer that runs a desktop operating system. The desktop computer 100 comprises at least one processor 101 (e.g., an INTEL processor; AMD processor), a main memory 104 (e.g., Dynamic Random Access Memory (DRAM)), a data storage device 102 (e.g., spinning hard disk drive, solid state drive), and other devices 103 (e.g., display screen, keyboard, graphics card, mouse, printer). The at least one processor 101 may have a plurality of processing cores. Instructions of program code (i.e., software) are stored in the main memory 104 for execution by the at least one processor 101 to cause the desktop computer 100 to perform the steps of the program code.

The desktop computer 100 is Windows-based in that it runs a desktop operating system 123 that is a MICROSOFT WINDOWS operating system, which is currently a version 11. As can be appreciated, embodiments of the present invention are equally applicable to other versions of the MICROSOFT WINDOWS operating system, such as the version 10 and future compatible versions.

The data storage device 102 stores files of the desktop computer 100, which in the example of FIG. 1 includes files of a plurality of drivers 112, 113, 114, etc. Being Windows-based, each of the drivers 112, 113, 114, etc. has a dot sys (i.e., ".sys") file extension. The driver 114 is referred to as a "vulnerable driver" in that it has a known vulnerability that has not been mitigated. A vulnerability is a weakness or flaw that can be exploited by a threat actor. A vulnerability may be mitigated by updating the vulnerable program, replacing the vulnerable program, etc.

In the example of FIG. 1, the data storage device 102 further stores files of an antivirus program 122 and the desktop operating system 123. A running instance of a program is also referred to as a "process". In the example of FIG. 1, a scan engine 136 running in the main memory 104 is a process of the antivirus program 122.

In the example of FIG. 1, the data storage device 102 further stores an executable suspicious file 121. As will be more apparent below, the file 121 is suspicious in that it opens a device handle using an object path that has a monitored device name, which is a device name associated with a known vulnerable driver. A device handle is an identifier that the desktop operating system 123 uses to identify a device object.

An application program can install a driver a variety of ways including by calling the InstallHinfSection function with a corresponding setup information (INF) file (not shown) of the driver. An INF file has a dot inf (i.e., ".inf") file extension. Once installed, the driver is managed by the desktop operating system 123 and can be started.

An installed driver can be started a variety of ways including by calling the StartService function. When the StartService function is called, the desktop operating system 123 loads the corresponding dot sys driver file into its memory space and calls the DriverEntry function of the driver for initialization. In the DriverEntry function, the driver can create a device object by calling the WdmlibIoCreateDeviceSecure function, which allows not only hardware drivers to create a physical device object for an associated hardware device but also enables software drivers to create a control device object that does not have an associated hardware device. The desktop operating system 123 manages the device object after being created. By convention, device objects are placed in the "\Device" directory.

To allow application programs to open a device handle to the device object, the driver creates a symbolic link in the "\GLOBAL?? " directory to the device name of the device object in the "\Device" directory, e.g., by calling the IoCreateSymbolicLink function. In other words, if the driver wants to let application programs obtain the device handle to the device object by calling the NtCreateFile function or the NtOpenFile function, the driver needs to create a symbolic link in the "\GLOBAL?? " directory, linking to the device object in the "\Device" directory. The device handle to the device object may be obtained by calling the NtCreateFile function or the NtOpenFile function with the symbolic link as an object path. The object path thus includes the device name of the device object. After opening the device handle, a process can send control codes to the device object by calling an input/output (I/O) function (e.g., DeviceIoControl function) using the device handle as a parameter. The effect of a control code varies by driver.

A device handle to a device object may be opened by invoking a suitable function that includes the object path to the device object as a parameter. A device handle is valid when the driver of the device is properly loaded and the object path is valid. Accordingly, opening a valid device handle does not result in an error code being returned by the desktop operating system 123.

In one embodiment, the user mode hook 133 is installed by the antivirus 122 in a process that is being monitored. The user mode hook 133 runs under the context of the process to hook particular functions such that the user mode hook 133 detects when the process calls the particular functions. In one embodiment, the user mode hook 133 hooks the NtCreateFile and NtOpenFile functions of "ntdll.dll", which is an NT Layer Dynamic Link Library that provides kernel functions that are accessible in user mode. The NtCreateFile and NtOpenFile functions allow a process to open, and thus access, an existing device object, i.e., a device object of an associated driver that has been properly loaded. The NtCreateFile and NtOpenFile functions include object attributes as a parameter, with the object attributes including an object path to the device object.

The user mode hook 133 gets executed whenever the NtCreateFile function or the NtOpenFile function is called by the process in which the user mode hook 133 is installed, thereby allowing the user mode hook 133 to detect open device events initiated by the process. It is to be noted that NtCreateFile and NtOpenFile functions do not have to be directly called by a process; the process could call another function that calls the NtCreateFile and NtOpenFile functions.

An open device event occurs when a process opens a device handle to a device object. In one embodiment, the device object in the open device event is a control device object; the control device object has an MS-DOS device name and has no associated hardware device. An MS-DOS device name is a symbolic link in the object manager with a name of the form "\DosDevices\DosDeviceName".

The user mode hook 133 collects open device event information of each open device event, including the object path that is used as a parameter to open the device handle and the identity of the process that caused the open device event. The user mode hook 133 may determine the process identifier (ID) of the process by calling the Win32 API GetCurrentProcessId function. The user mode hook 133 notifies the scan engine 136 of detected open device events, and provides the corresponding open device event information to the scan engine 136.

In one embodiment, the scan engine 136 identifies the device name of the device object from the object path. The device name may be found after a backslash character or between backslash characters of the object path string. For example, assuming the open device event has an object path "\?? \\mhyprot2" or "\?? \\mhyprot2\123", the device name "mhyprot2" may be identified from the object path by regular expressions or other suitable string processing algorithm. In the just mentioned example, the device name "mhyprot2" may be included in a list 125 of monitored device names.

The scan engine 136 compares a device name to device names in the list 125 to determine if the device name is a monitored device name. In one embodiment, a monitored device name is a device name associated with a known vulnerable driver. Known vulnerable drivers are published by cybersecurity organizations, such as in the National Vulnerability Database (NVD). For example, the vulnerability of the "mhyprot2.sys" driver is published in the MITRE Corporation Common Vulnerabilities and Exposures (CVE) list as CVE-2020-36603. A device name associated with a vulnerable driver may be found by reverse engineering the vulnerable driver, from Internet sources that discuss vulnerable drivers, starting the vulnerable driver and using a tool (e.g., winobj.exe), etc.

A normal process is a safe (i.e., good; not malicious) process. In one embodiment, the scan engine 136 deems a process to be indicative of a BYOVD attack if the process is not a normal process and the process opens a device handle to a device object that has a monitored device name. The scan engine 136 may perform a response action in response to detecting a BYOVD attack. The response action may include terminating the process indicative of the BYOVD attack, raising an alert, and/or performing further cybersecurity evaluations. The alert may include displaying a warning on a display screen, recording a corresponding entry in a security log, etc. The further cybersecurity evaluations may include scanning the process and file of the process for malware.

The scan engine 136 may detect normal processes a variety of ways. In one embodiment, the scan engine 136 deems a process to be normal when a process image file of the process is protected by the desktop operating system 123 (e.g., protected using the Win32 API SfcIsFileProtected function), has a valid digital signature, and/or has a normal reputation (e.g., by querying a reputation service or database). The scan engine 136 may also detect for normal processes in some other ways without detracting from the merits of the present invention.

Monitoring for device names associated with known vulnerable drivers is advantageous in that a device name is specified by the driver. In other words, a device name is not easily modified. In contrast, a vulnerability can exist in different versions of a driver, resulting in the different versions of the driver having different hashes. Detecting service name/image path/service image hash thus can get very difficult.

In an example operation, the suspicious file 121 is executed by the at least one processor 101, resulting in a suspicious process 132 of the suspicious file 121 running in the main memory 104. The suspicious process 132 then installs and starts the vulnerable driver 114 (see arrow 141). Starting the vulnerable driver causes the desktop operating system 123 to load the vulnerable driver 114 in its kernel-mode memory space 170 (see arrow 142). Loading the vulnerable driver 114 results in the vulnerable driver 114 creating a corresponding device object. The vulnerable driver 114 in the kernel-mode memory space 170 is relabeled as a loaded vulnerable driver 171 for clarity of explanation. Note that being in the kernel-mode memory space 170 allows the loaded vulnerable driver 171 to run in kernel-mode to have higher privileges to perform powerful but potentially harmful operations.

In the example of FIG. 1, the vulnerable driver 114 is a legitimate driver that is code signed, and accordingly trusted and loaded by the desktop operating system 123.

The suspicious process 132 opens the device handle to the device object using an object path to the device object as a parameter (see arrow 143). This allows the suspicious process 132 to receive and use the device handle to send control codes to the loaded vulnerable driver 171. The suspicious process 132 may open the device handle to the device object by calling the CreateFileA function with the object path as a parameter. The device handle to the target device object may also be opened using CreateFileW or CreateFile2 function.

The device handle to the device object is valid in the example operation because the loaded vulnerable driver process 171 has been successfully loaded. The CreateFileA API function internally calls the NtCreateFile function, which is hooked by the user mode hook 133. The user mode hook 133 accordingly detects the open device event initiated by the suspicious process 132. In response, the user mode hook 133 collects the event information of the open device event, notifies scan engine 136 of the open device event, and passes the corresponding open device event information to the scan engine 136 (see arrow 144). The open device event information includes the object path used to open the device handle and the process ID of the suspicious process 132.

The scan engine 136 identifies, from the open device event information, the object path used to open the device handle. The scan engine 136 parses the object path to identify the device name, and determines if the device name is a monitored device name by consulting the list 125 of monitored device names (see arrow 145).

The scan engine 136 also identifies, from the open device event information, that the suspicious process 132 is the process that caused the open device event. The scan engine 136 determines if the suspicious process 132 is a known normal process. In the example operation, the suspicious process 132 is not a normal process, and the open device event caused by the suspicious process 132 involves a monitored device name in the object path. Accordingly, the scan engine 136 detects the suspicious process 132 to be indicative of a BYOVD attack and may raise an alert and/or terminate the suspicious process 132 in response.

In the example operation, in response to detecting the suspicious process 132 to be indicative of a BYOVD attack, the scan engine 136 scans the suspicious process 132 (see arrow 146) and/or the suspicious file 121 (see arrow 147) for malware. The scan engine 136 may employ a conventional algorithm for scanning for malware, including pattern matching, behavioral monitoring, etc. In the example operation, the scan engine 136 detects that the suspicious process 132 and/or the suspicious file 121 is malicious. A response action may be taken against the suspicious process 132 and the suspicious file 121 including terminating the suspicious process 132, putting the suspicious file 121 in quarantine, raising an alert, etc.

Figure 2:
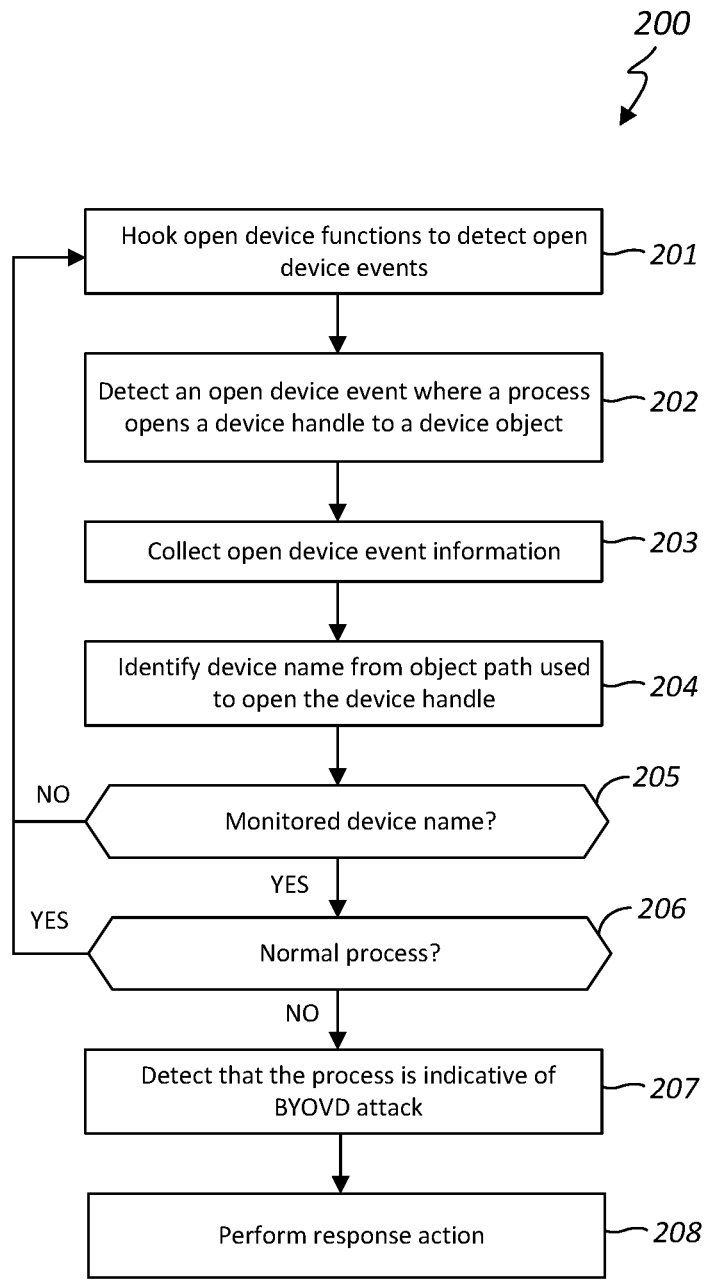
FIG. 2 shows a flow diagram of a method of detecting a BYOVD attack in a desktop computer, in accordance with an embodiment of the present invention.

FIG. 2 shows a flow diagram of a method 200 of detecting a BYOVD attack in a Windows-based desktop computer, in accordance with an embodiment of the present invention. The method 200 is explained using components disclosed in FIG. 1. As can be appreciated, other components may also be employed without detracting from the merits of the present invention.

In step 201, open device functions are hooked to detect open device events. In one embodiment, the step 201 is performed using a user mode hook that is installed in each process that is being monitored.

In step 202, an open device event is detected. The open device event occurs when a process being monitored opens a device handle to a device object that has been created by a driver. For example, an open device event occurs when the process calls the CreateFileA API function with an object path as a parameter to open the device handle to the device object.

In step 203, open device event information of the open device event is collected. The open device event information includes the object path that is used as a parameter to open the device handle. In one embodiment, the open device event information further includes the process ID of the process that caused the open device event.

In step 204, the device name of the device object is identified from the object path.

In step 205, it is determined if the device name is a monitored device name. In one embodiment, the device name is compared to a plurality of monitored device names that are associated with vulnerable drivers. The process that caused the open device event is ignored and not considered indicative of a BYOVD attack if the device name is not a monitored device name.

In step 206, it is determined if the process that caused the open device event is a normal process. The process is ignored and not considered indicative of a BYOVD attack if the process is a normal process.

In step 207, the process that caused the open device event is detected to be indicative of a BYOVD attack if the device name of the target device object is a monitored device name (step 205 to step 206) and the process is not a normal process (step 206 to step 207).

In step 208, a response action is performed in response to the process being detected to be indicative of the BYOVD attack. The response action may include terminating the process, raising an alert, performing further cybersecurity evaluations, etc. Performing further cybersecurity evaluations may include scanning the process and/or the file of the process for malware. Response actions that are responsive to detecting that the process and/or the file of the process is malware may include terminating the process, preventing the file of the process from being executed (e.g., putting the file in quarantine, deleting the file), etc.

While specific embodiments of the present invention have been provided, it is to be understood that these embodiments are for illustration purposes and not limiting. Many additional embodiments will be apparent to persons of ordinary skill in the art reading this disclosure

What is claimed is:

1. A method of detecting a Bring Your Own Vulnerable Driver (BYOVD) attack in a desktop computer, the method comprising:
   monitoring a process that is running on the desktop computer for open device events;
   detecting that the process opens a device handle to a device object created by a driver;
   obtaining an object path that is used as a parameter to open the device handle;
   identifying a device name of the device object from the object path;
   comparing the device name to a plurality of monitored device names associated with drivers that have known vulnerabilities;
   determining if the process is a normal process;
   detecting that the process is indicative of the BYOVD attack in response to the process is not a normal process and the device name is among the plurality of monitored device names; and
   performing a response action in response to detecting that the process is indicative of the BYOVD attack.

2. The method of claim 1, wherein the response action includes raising an alert.

3. The method of claim 1, wherein the response action includes scanning the process and/or a file of the process for malware.

4. The method of claim 1, wherein the response action includes terminating the process.

5. The method of claim 1, wherein the plurality of monitored device names are indicated in a list.

6. A desktop computer comprising at least one processor and a memory, the memory storing instructions that when executed by the at least one processor cause the desktop computer to:
   detect an open device event caused by a process executing in the desktop computer, the open device event opening a device handle to a device object created by a driver;
   determine a device name of the device object from open device event information of the open device event;
   determine if the device name matches any of a plurality of monitored devices names that are associated with drivers that have known vulnerabilities; and
   detect that the process is indicative of a Bring Your Own Vulnerable Driver (BYOVD) attack based at least on the device name matching one of the plurality of monitored device names.

7. The desktop computer of claim 6, wherein the instructions stored in the memory, when executed by the at least one processor, cause the desktop computer to:
   determine if the process is a normal process;
   detect that the process is indicative of the BYOVD attack based at least on the device name matching one of the plurality of monitored device names and the process is not a normal process; and
   perform a response action in response to the process being indicative of the BYOVD attack.

8. The desktop computer of claim 7, wherein the response action includes terminating the process.

9. The desktop computer of claim 7, wherein the response action includes raising an alert.

10. The desktop computer of claim 7, wherein the response action includes scanning the process and/or a file of the process for malware.

11. The desktop computer of claim 7, wherein the open device event opens a device handle to a device object.

12. The desktop computer of claim 7, wherein the instructions stored in the memory, when executed by the at least one processor, cause the desktop computer to determine the device name by:
    obtaining an object path that is used to open the device handle; and
    identifying the device name from a string of the object path.

13. A method of detecting a Bring Your Own Vulnerable Driver (BYOVD) attack, the method comprising:
    detecting an open device event where a process opens a device handle to a device object;
    determining a device name of the device object from open device event information of the open device event;
    determining if the device name is among a plurality of monitored device names that are associated with drivers with known vulnerabilities; and
    detecting that the process is indicative of a BYOVD attack based at least on the device name being among the plurality of monitored device names.

14. The method of claim 13, wherein determining the device name includes obtaining an object path that is used in opening the device handle, and identifying the device name from the object path.

15. The method of claim 14, further comprising:
    determining if the process is a normal process; and
    detecting that the process is indicative of the BYOVD attack based at least on the device name being among the plurality of monitored device names and the process not being a normal process.

16. The method of claim 13, further comprising:
    performing a response action in response to detecting that the process is indicative of the BYOVD attack.

17. The method of claim 16, wherein the response action includes raising an alert.

18. The method of claim 16, wherein the response action includes terminating the process.

19. The method of claim 16, wherein the response action includes scanning the process and/or a file of the process for malware.

* * * * *